(12) United States Patent
Funada

(10) Patent No.: US 8,773,592 B2
(45) Date of Patent: Jul. 8, 2014

(54) DISPLAY APPARATUS AND DISPLAY METHOD

(75) Inventor: Masahiro Funada, Utsunomiya (JP)

(73) Assignee: Canon Kabushiki Kaisha (JP)

( * ) Notice: Subject to any disclaimer, the term of this patent is extended or adjusted under 35 U.S.C. 154(b) by 433 days.

(21) Appl. No.: 13/023,872

(22) Filed: Feb. 9, 2011

(65) Prior Publication Data

US 2011/0194033 A1 Aug. 11, 2011

(30) Foreign Application Priority Data

Feb. 9, 2010 (JP) .................................. 2010-026915

(51) Int. Cl.
*H03M 1/12* (2006.01)

(52) U.S. Cl.
USPC .......................................... 348/572; 345/213

(58) Field of Classification Search
USPC ................... 348/571, 572, 536–542; 345/213
See application file for complete search history.

(56) References Cited

U.S. PATENT DOCUMENTS

| | | | | |
|---|---|---|---|---|
| 5,657,089 A | * | 8/1997 | Onagawa | 348/537 |
| 5,805,233 A | * | 9/1998 | West | 348/537 |
| 5,936,678 A | * | 8/1999 | Hirashima | 348/537 |
| 5,940,136 A | * | 8/1999 | Abe et al. | 348/537 |
| 6,097,444 A | * | 8/2000 | Nakano | 348/607 |
| 6,340,993 B1 | * | 1/2002 | Hasegawa et al. | 348/572 |
| 6,724,381 B2 | * | 4/2004 | Sakashita | 345/213 |
| 7,081,878 B2 | * | 7/2006 | Choi | 345/99 |
| 8,073,091 B2 | * | 12/2011 | Yamashita | 375/362 |
| 2001/0012003 A1 | * | 8/2001 | Murayama et al. | 345/208 |
| 2003/0156107 A1 | * | 8/2003 | Sakashita | 345/213 |
| 2004/0100583 A1 | * | 5/2004 | Yoneno | 348/537 |
| 2005/0020228 A1 | * | 1/2005 | Yearim | 455/260 |
| 2006/0274207 A1 | * | 12/2006 | Hayden et al. | 348/572 |
| 2007/0121007 A1 | * | 5/2007 | Waldner | 348/537 |
| 2009/0262244 A1 | * | 10/2009 | Buttimer et al. | 348/572 |
| 2011/0043700 A1 | * | 2/2011 | Ouyang et al. | 348/572 |

FOREIGN PATENT DOCUMENTS

| | | |
|---|---|---|
| JP | 11-167371 A | 6/1999 |
| JP | 11-177847 A | 7/1999 |
| JP | 2000-347615 A | 12/2000 |

* cited by examiner

*Primary Examiner* — Jefferey Harold
*Assistant Examiner* — Humam Satti
(74) *Attorney, Agent, or Firm* — Rossi, Kimms & McDowell, LLP

(57) ABSTRACT

A display apparatus is configured to control a clock generator so that a phase of a clock can maximize an integrated evaluation value that is an integrated value of a differential absolute value between adjacent pixels in an image display unit over one frame of a plurality of digital video signals corresponding to a plurality of clocks having different phases generated by the clock generator when a value made by dividing a maximum value of the integrated evaluation value by a minimum value of the integrated evaluation value is larger than a threshold, and to control the clock generator so that the phase of the clock can correspond to an intermediate position in a phase range in which the position becomes constant relative to the phase of the clock when the value made by dividing the maximum value by the minimum value is equal to or smaller than the threshold.

3 Claims, 4 Drawing Sheets

DISPLAY APPARATUS AND DISPLAY METHOD

BACKGROUND OF THE INVENTION

1. Field of the Invention

The present invention relates to a display apparatus and a display method.

2. Description of the Related Art

Conventionally, an automatic control method of a phase of a quantization clock (which may also be referred to as a "quantization phase" hereinafter) is known and used for a quantization of an analog video signal input from a computer to a display apparatus.

For example, Japanese Patent Laid-Open No. ("JP") 11-177847 discloses a method of adjusting a phase of a quantization clock so that the phase can maximize a differential absolute value between more than one adjacent image data in image data obtained by quantizing an input video signal of one frame with the quantization clock. JP 2000-347615 discloses a method of adjusting a phase of a quantization clock configured to maximize a video signal value (first embodiment) or a differential absolute value (second embodiment). Other prior art include JP 11-167371.

JP 11-177847 is effective to an image in which a slope of a variation of a video signal level usually inverts for each pixel (as in FIG. 2 of JP 2000-347615), but the phase is unavailable in other cases (such as FIG. 4 of JP 2000-347615).

JP 2000-347615 utilizes a maximum value of a video signal value in the former case, and a maximum value of a differential absolute value in the latter case. However, JP 2000-347615 assumes a signal having a reset potential as an input signal in the former case, and cannot be applied to an output signal from a computer. In addition, a differential absolute value between two adjacent pixels in JP 2000-347615 is subject to the noises and the quantizing precision is likely to decrease.

SUMMARY OF THE INVENTION

The present invention provides a display apparatus and a display method which can appropriately quantize an analog video signal regardless of its shape.

A display apparatus according to one aspect of the present invention includes a clock generator configured to generate a clock, an A/D converter configured to convert an analog video signal into a digital video signal in accordance with the clock, an image display unit including a plurality of pixels configured to display the digital video signal, a detector configured to detect a position at which the digital video signal starts or ends in a horizontal direction, and a phase controller configured to control the clock generator so that a phase of the clock can maximize an integrated evaluation value that is an integrated value of a differential absolute value between adjacent pixels in the image display unit over one frame of a plurality of digital video signals corresponding to a plurality of clocks having different phases generated by the clock generator when a value made by dividing a maximum value of the integrated evaluation value by a minimum value of the integrated evaluation value is larger than a first threshold, and to control the clock generator so that the phase of the clock can correspond to an intermediate position in a phase range in which the position becomes constant relative to the phase of the clock when the value made by dividing the maximum value by the minimum value is equal to or smaller than the first threshold.

Further features of the present invention will become apparent from the following description of exemplary embodiments with reference to the attached drawings.

DESCRIPTION OF THE EMBODIMENTS

Figure 1:
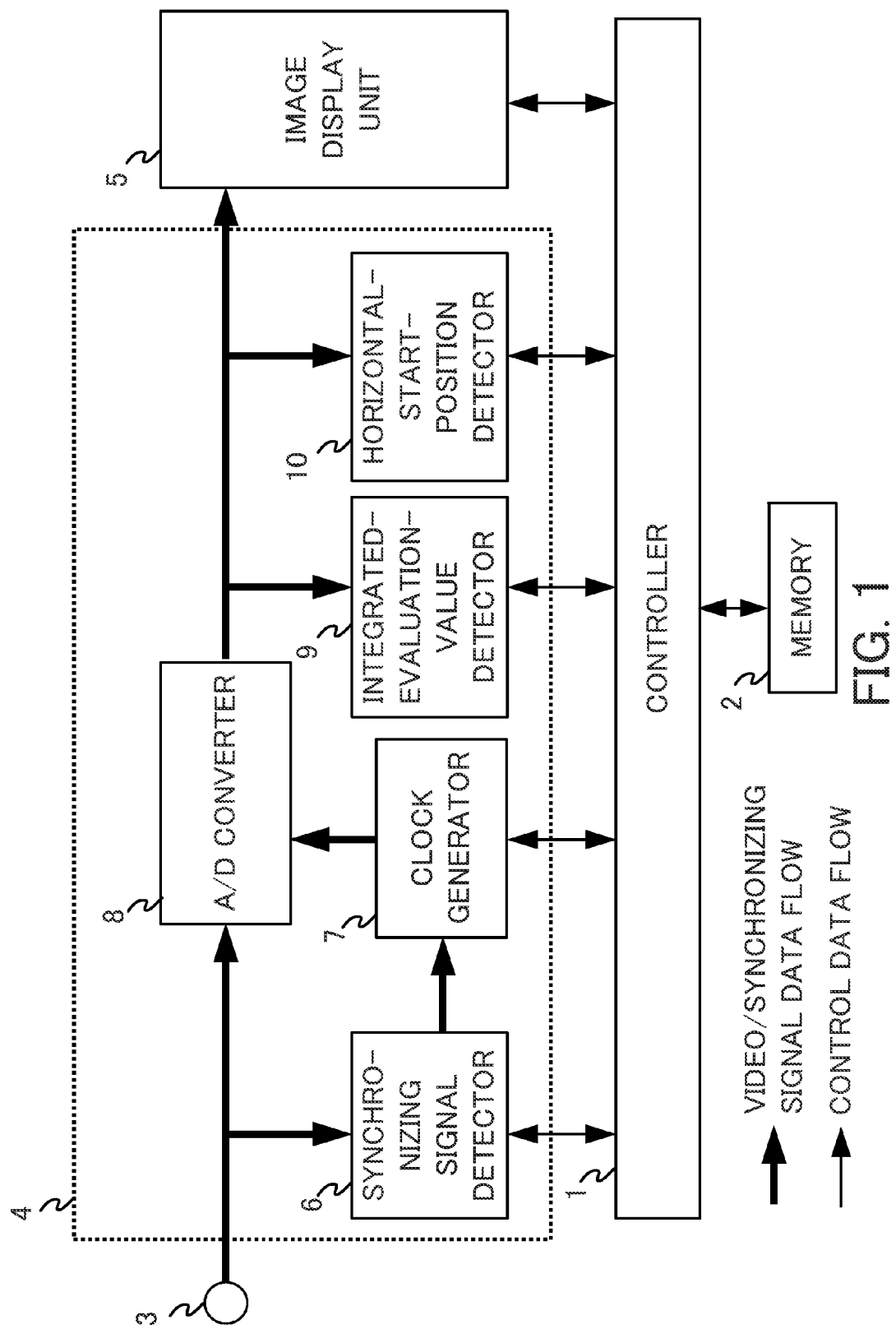
FIG. 1 is a block diagram of a display apparatus according to this embodiment.

FIG. 1 is a block diagram of a display apparatus according to this embodiment. The display apparatus includes a controller 1, a memory 2, an analog video input terminal 3, a quantizer 4, and an image display unit 5. The display apparatus of this embodiment is applicable to a liquid crystal projector, a digital light processing ("DLP") projection type display apparatus, and a liquid crystal display.

Figure 2:
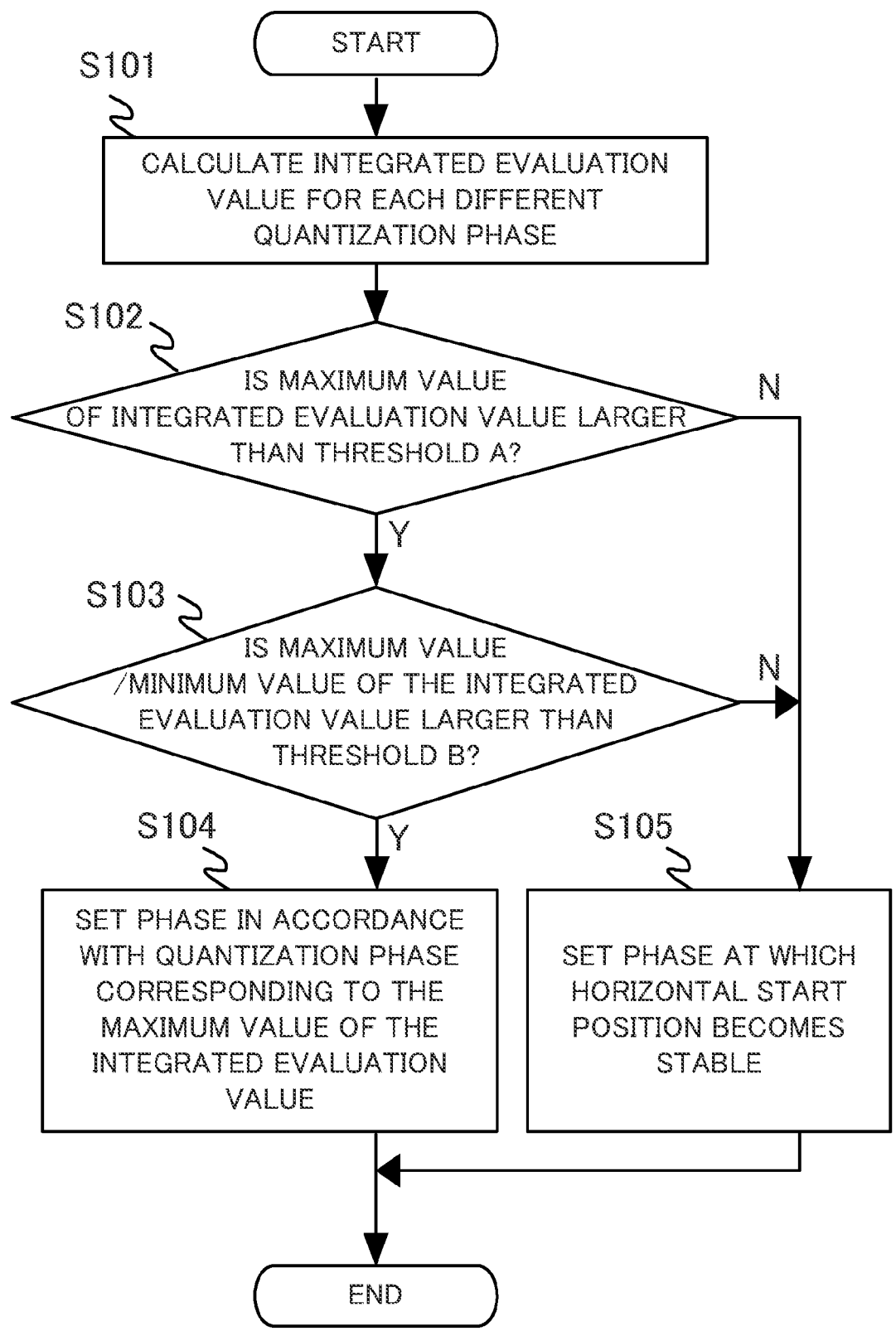
FIG. 2 is a flowchart for explaining an operation of a controller illustrated in FIG. 1.

The controller 1 controls each component in the display apparatus, and automatically controls a (quantization) phase of the quantization clock (sampling clock) illustrated in FIG. 2. The controller 1, as described later, serves as a phase controller configured to control a (quantization) phase of the quantization clock generated by the clock generator 7.

The memory 2 stores a variety of programs and data containing an operation illustrated in FIG. 2 executed by the controller 1. The data contains a threshold A (second threshold), a threshold B (first threshold), and a relationship between the phase of the quantization clock and the horizontal start or end position, which will be described later.

The analog video input terminal 3 is an input terminal used to receive an analog video signal of an electronic apparatus, such as a computer, a PDA, and a game machine, and is implemented as a D-sub terminal in this embodiment.

The quantizer 4 quantizes (digitalizes or performs an analog-to-digital conversion for) an input analog video signal into the digital video signal based upon a quantization phase and a frequency of the quantization clock (referred to as a "quantization frequency" hereinafter) set by the controller 1. The quantizer 4 detects an integrated value of a differential absolute value (referred to as an "integrated evaluation value" hereinafter) and a video level transition phase as a quantization phase with which the video signal level transits, and the quantizer 4 outputs the result to the controller 1.

The quantizer 4 includes a synchronizing signal detector 6, a clock generator 7, an A/D converter 8, an integrated-evaluation-value detector 9, and a horizontal-start-position detector 10.

The synchronizing signal detector 6 determines whether or not there is a synchronizing signal, and detects a period of a horizontal synchronizing signal, and a count number of a horizontal synchronizing signal per one period of a vertical synchronizing signal (or a vertical line number). The controller 1 determines a quantization frequency and an effective video area of the input analog video signal based upon the detected values.

The clock generator 7 generates and outputs the quantization clock. The quantization frequency is adjusted by multiplying the horizontal synchronizing signal by a magnification set by the controller 1. The quantization phase is also adjusted by the value set by the controller 1.

The A/D converter 8 performs an analog-to-digital conversion for the analog video signal with the quantization clock output from the clock generator 7, and outputs the digital video signal, the clock signal, and the synchronizing signal. In other words, this embodiment samples the analog video signal at the leading edge of the quantization clock, and converts it into a digital video signal in accordance with its signal intensity.

The integrated-evaluation-value detector 9 detects a differential integrated value that is an integrated value of an absolute value of a difference of a video signal value among adjacent pixels of the digital video signal. Thus, an input video signal in which white and black continuously changes in the horizontal direction has a maximum detection value. The integrated-evaluation-value detector 9 outputs the combined values of the RGB channels but may output only one of the RGB channels. The detected value is reset by the vertical synchronizing signal, and the integrated-evaluation-value detector 9 outputs a detection value of the previous frame in response to an acquisition request from the controller 1.

The horizontal-start-position detector 10 detects a horizontal start position at which the horizontal image starts in the digital video signal. The horizontal start position appears when the luminance signal first exceeds a predetermined value after the horizontal synchronizing signal, and the horizontal end position appears when the luminance signal last exceeds a predetermined value.

The horizontal start position is determined based upon a threshold set by the controller 1. The number of clocks is counted after the horizontal synchronizing signal comes, and the horizontal start position is defined as a position at which the video signal value initially exceeds the threshold in one of the RGB channels. A minimum value is held until the next vertical synchronizing signal comes. The stored value is reset by the vertical synchronizing signal, and the horizontal start position of the previous frame is output in response to an acquisition request from the controller 1. The horizontal-start-position detector 10 is used to detect the video level transition phase that is a quantization phase with which the input video signal level transits.

Instead of the horizontal-start-position detector 10, a horizontal-end-position detector configured to detect a horizontal end position or an effective-video-area detector configured to detect the horizontal effective video area may be used. Each of the horizontal-start-position detector 10, the horizontal-end-position detector, and the effective-video-area detector serves as a detector configured to detector a position at which the digital video signal starts or ends in the horizontal direction.

The image display unit 5 has an image display element having a plurality of adjacently arranged pixels, and displays an input digital video signal as a light picture.

FIG. 2 is a flowchart of an automatic quantization-phase controlling method of this embodiment executed by the controller 1. The flowchart illustrated in FIG. 2 is implemented as a program to be executed by a processor. In FIG. 2, "S" stands for the step.

Initially, in S101, the controller 1 sequentially changes the phase of the quantization clock of the clock generator 7, and each time stores in the memory 2 the integrated evaluation value as a detected result of the integrated-evaluation-value detector 9, and the horizontal-start-position as the detected result of the horizontal-start-position detector 10.

Next, in S102, the controller 1 determines whether the integrated evaluation value is a sufficiently large value or whether the SN ratio is sufficient by determining whether a maximum value of the integrated evaluation value is larger than a threshold A (second threshold). When the integrated evaluation value is larger than the threshold A, the flow moves to S103. When the integrated evaluation value is equal to or smaller than the threshold A (second threshold), the flow transfers to S105.

The threshold A is set based upon how much noise components the integrated-evaluation-value detector 9 may contain in accordance with the entire area containing the blanking area or the effective video area of the input video signal. Thereby, the determination precision at which the SN ratio is sufficient can improve.

For example, the threshold A may be set to about 2% of the maximum detected value detectable by the integrated-evaluation-value detector 9 (which is calculated as 255×1024×768×3 when the A/D converter 8 has a resolution of 8 bits and the effective video area is 1024×768 pixels).

Alternatively, the threshold A may be set to a value made by doubling a value of a noise component by assuming that the noise component is 1% in all pixels calculated by the total pixel number containing blanking in the horizontal direction and the total line number in the vertical direction. All pixels may be similarly calculated by replacing the effective video area with the total pixel number.

The threshold A may be set to be low when the A/D converter 8 provides a low-pass filter or there is a small noise amount on the circuit configuration.

When an integrated evaluation value is detected by cutting off some low bits of a difference of the video signal value, a large noise amount is cut off and thus S102 itself may be omitted. Thereby, the automatic control process may become simpler.

Next, in S103, the controller 1 determines whether there are comparatively many inverts of a slope of a variation of a video signal level in the input video signal for each pixel. More specifically, the controller 1 compares whether a value made by dividing a maximum value of the integrated evaluation value by a minimum value of the integrated evaluation value (maximum value/minimum value) is larger than a threshold B (first threshold). When it is larger than the threshold B, the flow transfers to S104, and when it is equal to or smaller than the threshold B (or the first threshold), the flow transfers to S105.

The "integrated evaluation value," as used herein, is an integrated value over one frame of a ratio of a variation (absolute value) for each A/D converted pixel value from the pixel preceding by one clock. Among the detected values of the integrated evaluation value with each phase, a minimum value is set to a minimum value of the integrated evaluation value and a maximum value is set to the maximum value of the integrated evaluation value.

A similar effect can be obtained by evaluating the maximum value of the variance in S102, and by evaluating the maximum value/minimum value of the variance in S103.

Figure 3:
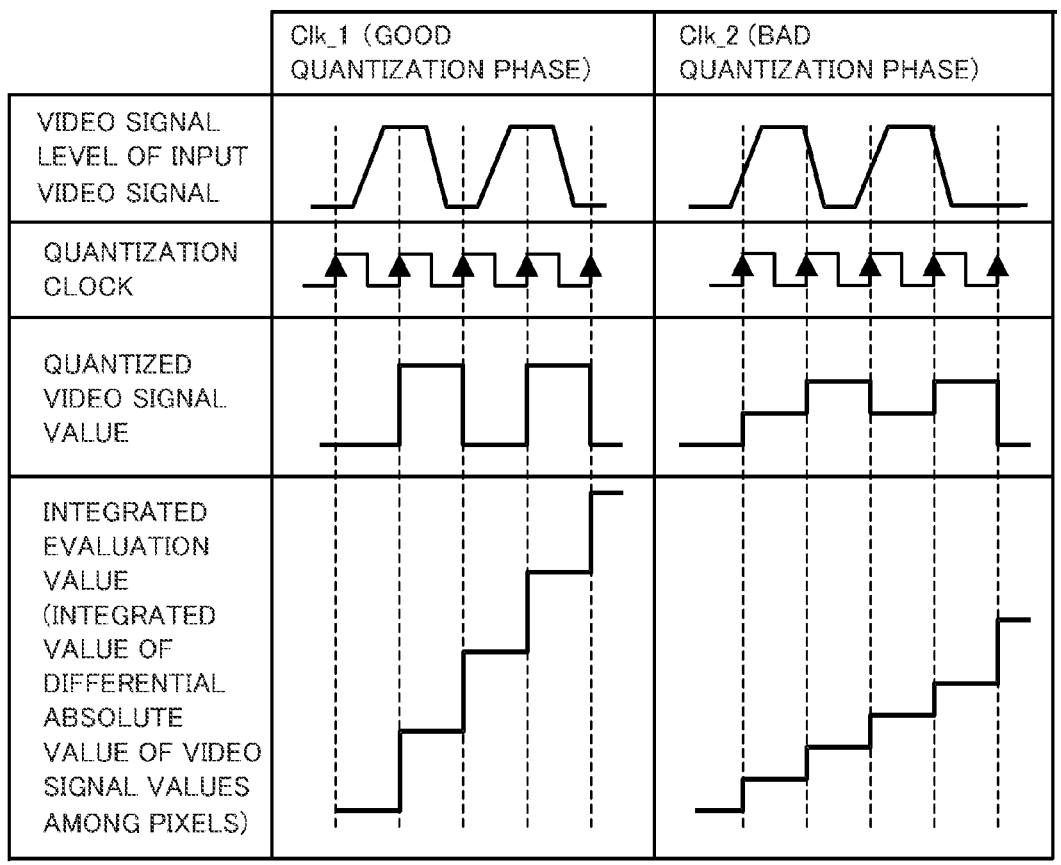
FIG. 3 is a view illustrating good and bad quantization examples when an input video signal is received in which a slope of a variation of a video signal level inverts for each pixel.
Figure 4:
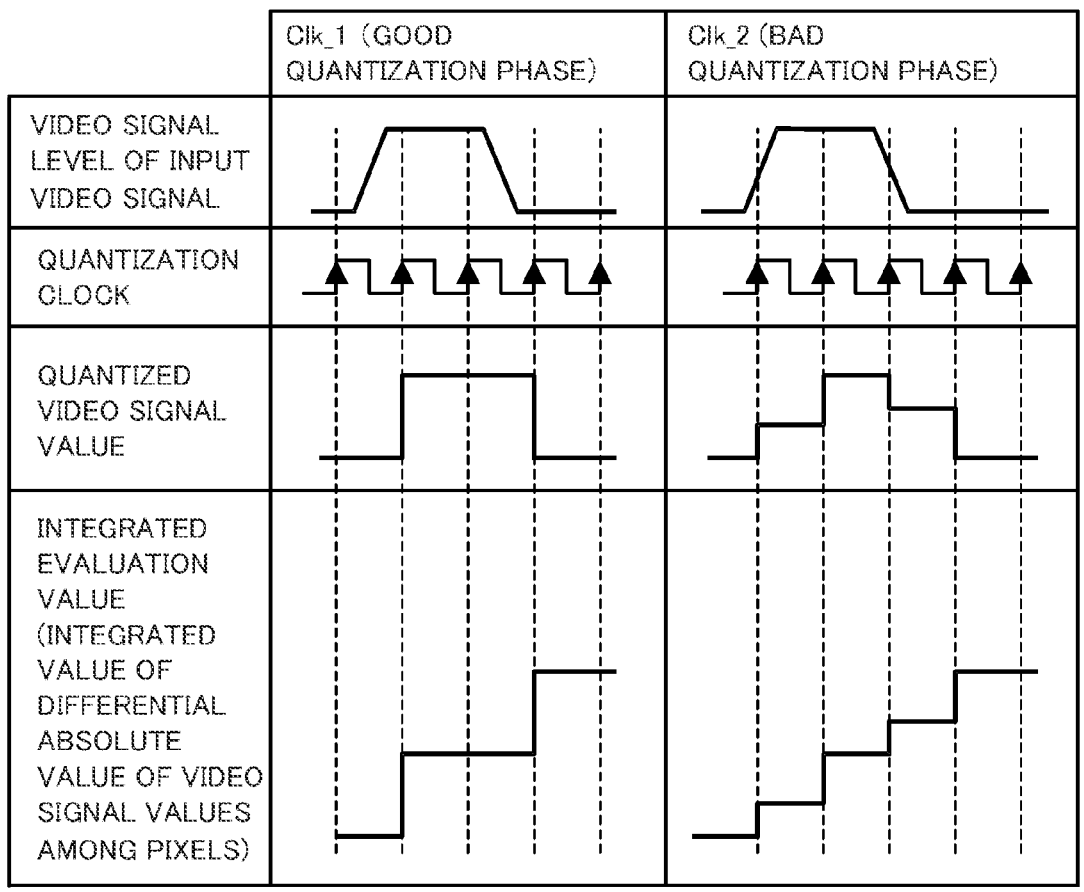
FIG. 4 is a view illustrating good and bad quantization examples when an input video signal is received in which a slope of a variation of a video signal level does not invert for each pixel.

An uppermost column in FIG. 3 illustrates an input video signal received by the analog video input terminal 3 in which the slope of the variation of the video signal level inverts for each pixel. An uppermost column in FIG. 4 illustrates an input video signal received by the analog video input terminal 3 in which the slope of the variation of the video signal level does not invert for each pixel. When the signals at the uppermost columns of FIGS. 3 and 4 are quantized with the quantization clock of the second columns, this embodiment automatically adjusts the bad quantization phase on the third column on the right side to the good quantization phase on the third column on the right side.

As illustrated in FIG. 3, in the input video signal in which the slope of the variation of the video signal level usually inverts for each pixel, a maximum value/minimum value increases as a result of that an integrated evaluation value becomes larger for the good quantization phase and smaller for the bad quantization phase.

On the other hand, as illustrated in FIG. 4, in the input video signal in which the slope of the variation of the video signal level seldom inverts for each pixel, a maximum value/minimum value decreases as a result of that there is few difference of the integrated evaluation value between the good quantization phase and the bad quantization phase.

The threshold B is set to a value used to extract the input video signal of FIG. 3 in the input analog video signal, such as a value of 1.2 or larger. Since the threshold B has a close relationship with the SN ratio, the controller 1 may control the threshold B to a larger value as the SN ratio is lower or the maximum value of the integrated evaluation value is smaller.

The integrated evaluation value does not become zero except when a black image of the entire screen is input. A pattern that has a minimum value of 0 is excluded by the condition of S102. If the minimum value of the integrated evaluation value is zero when S102 is removed, this embodiment ends the phase control on the way.

When the integrated evaluation value is larger than the threshold A in S102 and larger than the threshold B in S103, the flow transfers to S104 and otherwise the flow transfers to S105.

In S104, the controller 1 adjusts the clock generator 7 so that the quantization phase can maximize the integrated evaluation value as disclosed in JP 11-177847, because the integrated evaluation value is a sufficiently large value and the slope of the variation of the video signal level usually invert for each pixel in the input video signal.

As a result, as illustrated in FIG. 3, an optimal phase can be detected with the integrated evaluation value in the input video signal in which the slope of the variation of the video signal level usually inverts for each pixel. The controller 1 may control the clock generator 7 so as to provide the optimal phase other than the phase that maximizes the integrated evaluation.

On the other hand, in S105, the controller 1 controls the clock generator 7 so as to provide a phase shifted from the video level variation phase by a proper amount, because there is a large noise amount or the slope of the variation of the video signal level seldom inverts for each pixel in the input video signal.

In this embodiment, the controller 1 performs a process to find an optimal phase based on a phase with which the horizontal start position changes. Thereby, as illustrated in FIG. 4, a good phase can be detected with a phase adjustment utilizing the horizontal start position even in the input video signal in which the slope of the variation of the video signal level seldom inverts for each pixel.

The process used to find the optimal phase in S105 may be a process configured to set the optimal phase to a phase that is made by shifting the quantization phase with which the horizontal start position changes by a phase corresponding to ½ quantization clock as in JP 11-167371.

In other words, as illustrated in FIGS. 2 and 3 in JP 11-167371, the display apparatus may include a D/A converter connected to the controller 1 and the clock generator 7 and configured to provide a D/A conversion for an output of the controller 1, and the clock generator 7 may include a phase comparator, an adder, a loop filter, and a frequency divider. As illustrated in FIG. 4 of JP 11-167371, an output value (abscissa axis) of the D/A converter and a horizontal start position (ordinate axis) detected by the horizontal-start-position detector 10 has a stepwise increasing relationship, and a horizontal start value is approximately constant for a predetermined output range of the D/A converter.

In this case, the controller 1 sets the optimal phase to a phase corresponding to an intermediate value in the output range of the D/A converter. The controller 1 can find the optimal quantization phase by continuously changing the output value of the D/A converter and by finding an intermediate value between the output value of the D/A converter with which the horizontal start value changes and the output value of the D/A converter with which the horizontal start value next changes.

Instead of converting the output range of the D/A converter into the phase range, the memory 2 can previously store a relationship between the quantization phase and the horizontal start position. Alternatively, instead of storing the information in the memory 2, the display apparatus may obtain the information via the network, such as the Internet. Then, based on the relationship between the quantization phase and the horizontal start position and the detected result by the horizontal-start-position detector 10, the controller 1 controls the clock generator 7 so that the quantization phase can correspond to the intermediate position (which corresponds to the D/A value of nearly 96 in JP 11-167371) in the phase range in which the horizontal start position becomes constant or stable.

The method of finding the optimal phase in S105 is not limited to this embodiment. For example, when a phase with which the horizontal start position changes while a threshold of the horizontal-start-position detector 10 is being changed, a more precise control is available because the slope of the level transition can be calculated for a phase near the horizontal start position.

Thus, the above control can precisely provide an optimal quantization phase for an image in which the slope of the variation of the video signal level usually inverts for each pixel, and provide an acceptable quantization phase for an image in which the slope seldom inverts for each pixel.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-026915, filed Feb. 9, 2010 which is hereby incorporated by reference herein in its entirety.

What is claimed is:

1. A display apparatus comprising:
   a clock generator configured to generate a clock;
   an A/D converter configured to convert an analog video signal into a digital video signal in accordance with the clock;
   an image display unit including a plurality of pixels configured to display the digital video signal;
   a detector configured to detect a position at which the digital video signal starts or ends in a horizontal direction; and
   a phase controller configured to control the clock generator so that a phase of the clock can maximize an integrated evaluation value that is an integrated value of a differential absolute value between adjacent pixels in the image display unit over one frame of a plurality of digital video signals corresponding to a plurality of clocks having different phases generated by the clock generator when a value made by dividing a maximum value of the integrated evaluation value by a minimum value of the integrated evaluation value is larger than a first threshold, and to control the clock generator so that the phase of the clock can correspond to an intermediate position in a phase range in which the position becomes constant relative to the phase of the clock when the value made by dividing the maximum value by the minimum value is equal to or smaller than the first threshold.

2. The display apparatus according to claim 1, wherein the phase controller determines whether the value made by dividing the maximum value of the integrated evaluation value by the minimum value of the integrated evaluation value is larger than the first threshold when the maximum value of the integrated evaluation value is larger than a second threshold, and controls the clock generator so that the phase of the clock can correspond to the intermediate position when the maximum value of the integrated evaluation value is equal to or smaller than the second threshold.

3. A display method of displaying on an image display unit having a plurality of pixels a digital video signal generated by quantizing an analog video signal, the display method comprising:

controlling through a processor a clock generator so that a phase of the clock can maximize an integrated evaluation value that is an integrated value of a differential absolute value between adjacent pixels in the image display unit over one frame of a plurality of digital video signals corresponding to a plurality of clocks having different phases generated by the clock generator when a value made by dividing a maximum value of the integrated evaluation value by a minimum value of the integrated evaluation value is larger than a first threshold; and controlling through the processor the clock generator so that the phase of the clock can correspond to an intermediate position in a phase range in which a position at which the digital video signal starts or ends in a horizontal direction becomes constant relative to the phase of the clock when the value made by dividing the maximum value by the minimum value is equal to or smaller than the first threshold.

* * * * *